(12) United States Patent
Lee et al.

(10) Patent No.: US 10,723,456 B2
(45) Date of Patent: Jul. 28, 2020

(54) UNMANNED AERIAL VEHICLE SYSTEM HAVING MULTI-ROTOR TYPE ROTARY WING

(71) Applicant: KOREA INSTITUTE OF SCIENCE AND TECHNOLOGY, Seoul (KR)

(72) Inventors: Taikjin Lee, Seoul (KR); Suk Woo Nam, Seoul (KR); Chang Won Yoon, Seoul (KR); Hyun Seo Park, Seoul (KR); Young Min Jhon, Seoul (KR); Seok Lee, Seoul (KR); Min-Jun Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 231 days.

(21) Appl. No.: 15/375,590

(22) Filed: Dec. 12, 2016

(65) Prior Publication Data
US 2017/0369169 A1    Dec. 28, 2017

(30) Foreign Application Priority Data

Jun. 24, 2016    (KR) .................. 10-2016-0079273
Dec. 1, 2016    (KR) .................. 10-2016-0162885

(51) Int. Cl.
*B64D 5/00*    (2006.01)
*B64C 39/02*    (2006.01)

(52) U.S. Cl.
CPC ............. *B64D 5/00* (2013.01); *B64C 39/024* (2013.01); *B64C 2201/027* (2013.01);
(Continued)

(58) Field of Classification Search
CPC ............... B64D 5/00; B64C 2201/082; B64C 2201/127; B64C 2201/206;
(Continued)

(56) References Cited

U.S. PATENT DOCUMENTS

| 2,780,422 | A | * | 2/1957 | Maglio, Jr. ............. | B64D 5/00 244/2 |
| 4,917,329 | A | * | 4/1990 | Vollmerhausen ........ | B64D 5/00 244/2 |

(Continued)

FOREIGN PATENT DOCUMENTS

| CN | 205060020 U | 3/2016 |
| JP | 2016-64768 A | 4/2016 |

(Continued)

OTHER PUBLICATIONS

Korean Office Action dated Sep. 14, 2017 in counterpart Korean Application No. 10-2016-0162885 (9 pages with English Abstract).

*Primary Examiner* — Christopher D Hutchens
(74) *Attorney, Agent, or Firm* — NSIP Law

(57) ABSTRACT

The present invention relates to an unmanned aerial vehicle system having a multi-rotor type rotary wing. The unmanned aerial vehicle system having a multi-rotor type rotary wing includes a first unmanned aerial vehicle, at least one second unmanned aerial vehicle, and a bridge that connects the first unmanned aerial vehicle and the at least one second unmanned aerial vehicle to be separable from each other, wherein the at least one second unmanned aerial vehicle is moveable by the first unmanned aerial vehicle in a state where the at least one second unmanned aerial vehicle is coupled to the first unmanned aerial vehicle by the bridge without being driven, and the at least one second unmanned aerial vehicle is separable from the first unmanned aerial vehicle which is in flight.

12 Claims, 10 Drawing Sheets

(52) U.S. Cl.
CPC .. *B64C 2201/042* (2013.01); *B64C 2201/066* (2013.01); *B64C 2201/082* (2013.01); *B64C 2201/108* (2013.01); *B64C 2201/127* (2013.01); *B64C 2201/146* (2013.01); *B64C 2201/206* (2013.01)

(58) Field of Classification Search
CPC ................ B64C 2211/00; B64C 37/02; B64C 2201/027; B64C 2201/20–208
USPC ............................................................ 244/2
See application file for complete search history.

(56) References Cited

U.S. PATENT DOCUMENTS

| | | | |
|---|---|---|---|
| 5,000,398 A * | 3/1991 | Rashev | .................. B64C 27/08 244/110 E |
| 8,950,698 B1 | 2/2015 | Rossi | |
| 10,099,561 B1 * | 10/2018 | Ananthanarayanan | ...................... B64C 39/024 |
| 2007/0215748 A1 * | 9/2007 | Robbins | ................ B64C 39/024 244/12.5 |
| 2016/0214717 A1 * | 7/2016 | De Silva | ................ B64D 47/08 |
| 2016/0364989 A1 * | 12/2016 | Speasl | .................. B64C 39/024 |
| 2017/0313421 A1 * | 11/2017 | Gil | ........................... B64D 1/00 |
| 2017/0369169 A1 * | 12/2017 | Lee | ........................... B64D 5/00 |
| 2019/0176986 A1 * | 6/2019 | Addonisio | ............ B64C 39/024 |
| 2019/0359351 A1 * | 11/2019 | Fisher | ................. G05D 1/0011 |

FOREIGN PATENT DOCUMENTS

| | | | |
|---|---|---|---|
| KR | 10-2013-0009891 A | 1/2013 | |
| KR | 10-2016-0106826 A | 9/2016 | |
| WO | WO-2014080386 A2 * | 5/2014 | ............... B64D 5/00 |
| WO | WO 2015/051436 A1 | 4/2015 | |

* cited by examiner

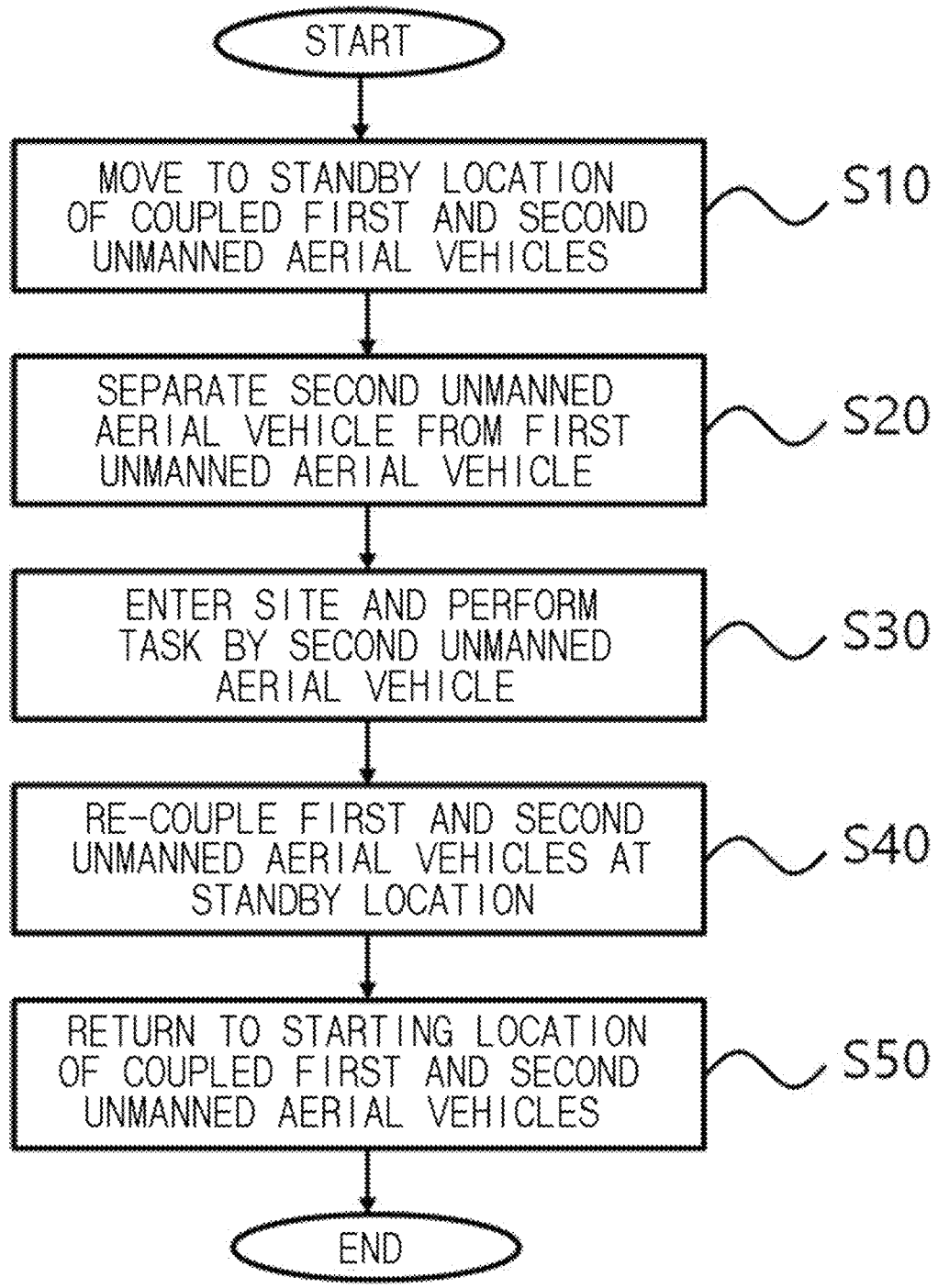

UNMANNED AERIAL VEHICLE SYSTEM HAVING MULTI-ROTOR TYPE ROTARY WING

CROSS-REFERENCE TO RELATED APPLICATION(S)

This application claims the benefit under 35 USC § 119(a) of Korean Patent Application No. 10-2016-0079273 filed on Jun. 24, 2016, and Korean Patent Application No. 10-2016-0162885, filed on Dec. 1, 2016 in the Korean Intellectual Property Office, the entire disclosure of which is incorporated herein by reference for all purposes.

BACKGROUND

1. Field of the Invention

The present invention relates to an unmanned aerial vehicle system having a multi-rotor type rotary wing, and more particularly, to an unmanned aerial vehicle system in which a plurality of unmanned aerial vehicles are detachably coupled and operable to be simultaneously or separately movable.

2. Discussion of Related Art

Recently, multinational IT companies such as Google or Amazon have focused on services using drones. For example, utilization fields of the services using drones such as unmanned delivery systems, surveillance systems, shooting systems, etc., are very wide.

As commercial drones evolve, commercial demand, which is just 1% of the total drones market as of 2016, is expected to grow to 7% in 2023.

The drones are unmanned aerial vehicles and at the same time they are capable of hovering because they are rotary wings unlike fixed-wing unmanned aerial vehicles. In addition, since the drone is a multi-rotor type with a small rotor size, it is more stable and safe than a helicopter having one rotor. Moreover, since the drones are motor-based rather than engine-driven, they have excellent control performance and relatively low noise, so that their utilization is getting a lot of attention. That is, since the drone is operated by a multi-rotor having a small size, it is relatively safe and has an advantage of being easy to be operated in a complicated environment such as a city center.

In addition, since the drones are closer to robots than traditional aircraft, it is relatively easy to graft the drones onto information communication technologies such as IoT. For example, since it is very easy to attach and detach other equipment such as a camera to and from the drones, the drones are already used for shooting and monitoring by using the camera.

However, the biggest weakness of the drones is the operating time, and this is because the drones are battery powered using motors. In general drones, the operating time is not easy to exceed 20 minutes. Moreover, since the drones are small and battery type, the loading capacity is small.

In addition, since the drone is a multi-rotor type, there is a problem it is vulnerable to disturbance compared to a large one-rotor. In order to be strong against disturbance, the size of the drone must be increased. However, in this case, it is impossible to take advantage of the drone that is small in size and excellent in control performance. These problems make it difficult to use the drones especially between high-rise buildings in downtown with strong disturbances or in monitoring tasks in mountainous areas.

For example, when a fire occurs in a high-rise building, it is necessary to put the drone into the fire site to monitor the situation on the site and get information about the survivor before the rescue crew enters the fire site. Particularly, in comparison with a ground-driven robot driven by wheels, when an indoor drone is put in the disaster site due to the situation of the site structure, the rate of rescue of the disaster site can be increased. However, in the case of the indoor drone, the size of the drone should be small because a safety problem occurs when the size is large, but it is very difficult for the small-sized drone to rise to the corresponding floor when a fire occurs in a high-rise building. In addition, it is necessary to save the battery to secure the operating time of the drone, but even if the drone can be raised to the high level, the battery consumption is so severe that it is difficult to perform a desired operation in the high-rise building for a necessary time.

In addition, there is always a risk of falling in the performance of tasks such as structural diagnosis or reconnaissance, and therefore it is advantageous for the size of the drone to be small for the safety of the structure when the drone falls. As a result, small-sized drones are effective to maximize the advantageous of the drones, but the small drones are short in operating time due to battery problems and are also susceptible to disturbance. Therefore, there has been a demand for a drone system capable of stably accessing a high-rise disaster site outdoors such as a high-rise building and capable of entering the room and performing smoothly the task.

Korean Patent Laid-Open Publication No. 2016-0106826 discloses a plurality of drones. FIG. 1 is a schematic diagram illustrating a plurality of drones according to the prior art. Referring to FIG. 1, a conventional drone having at least one flying source 14 and a controller 16 includes at least one baby drone 10b having a control unit 16a controlled by the controller 16, and a mother drone 10a having the at least one baby drone 10b. These mother and baby drones include at least one typical fixing body 15 which is simultaneously or individually provided to the mother drone 10a and the baby drone 10b and coupled to each other, at least one typical sensor 15a that detects mutual coupling provided in the fixing body 15, and the control unit 16a that controls the mother drone 10a and the baby drone 10b and further controls the fixing body 15 using a signal of the sensor 15a.

Although such conventional plurality of drones disclose a drone system in which a plurality of drones are coupled and separated, they are difficult to meet the purpose of the drone system that is currently required in view of the fact that a plurality of drones are horizontally connected and operated due to the operational characteristics of an unmanned aerial vehicle having a rotary wing.

PRIOR ART LITERATURE

Patent Literature (Patent literature 1) KR20160106826, JP2016064768A, U.S. Pat. No. 8,950,698

SUMMARY OF THE INVENTION

The present invention is directed to providing an unmanned aerial vehicle system having a multi-rotor type rotary wing, in which one unmanned aerial vehicle may transport another unmanned aerial vehicle and the unmanned aerial vehicle separated from a specific location may be configured to be individually operable, using a plurality of detachably coupled unmanned aerial vehicles in order to solve the above-described operational problem of the unmanned aerial vehicle.

The scope of the present invention is not limited to the above-described objects, and other unmentioned objects may be clearly understood by those skilled in the art from the following descriptions.

According to an aspect of the present invention, there is provided an unmanned aerial vehicle system having a multi-rotor type rotary wing including: a first unmanned aerial vehicle; at least one second unmanned aerial vehicle; and a bridge that connects the first unmanned aerial vehicle and the at least one second unmanned aerial vehicle to be separable from each other, wherein the at least one second unmanned aerial vehicle is moveable by the first unmanned aerial vehicle in a state where the at least one second unmanned aerial vehicle is coupled to the first unmanned aerial vehicle by the bridge without being driven, and the at least one second unmanned aerial vehicle is separable from the first unmanned aerial vehicle which is in flight.

Preferably, the at least one second unmanned aerial vehicle may be coupled vertically above or below the first unmanned aerial vehicle by the bridge. Here, a plurality of the second unmanned aerial vehicles may be coupled by a plurality of bridges attached to the first unmanned aerial vehicle, or a plurality of second unmanned aerial vehicles may be coupled consecutively by the bridge attached to the second unmanned aerial vehicle coupled to the first unmanned aerial vehicle.

Preferably, the at least one second unmanned aerial vehicle may have a smaller size than that of the first unmanned aerial vehicle.

Preferably, in a state where the first unmanned aerial vehicle and the at least one second unmanned aerial vehicle are coupled to each other, only the first unmanned aerial vehicle may generate a lift force and the at least one second unmanned aerial vehicle does not generate a lift force. When the at least one second unmanned aerial vehicle generates a lift force to be separated from the first unmanned aerial vehicle, the first unmanned aerial vehicle may reduce the lift force by the lift force generated by the at least one second unmanned aerial vehicle, and when the at least one second unmanned aerial vehicle reaches a normal state so that the at least one second unmanned aerial vehicle is separated from the first unmanned aerial vehicle, the lift force of the at least one second unmanned aerial vehicle may remain as is, and the first unmanned aerial vehicle may return to a lift force in which hovering is possible by the first unmanned aerial vehicle alone.

Preferably, the first unmanned aerial vehicle may transport the at least one second unmanned aerial vehicle up to a standby location, and the at least one second unmanned aerial vehicle may be separated from the first unmanned aerial vehicle at the standby location and enters a target location. Here, the standby location may be located outdoors, and the target location may be located indoors.

Preferably, the unmanned aerial vehicle system may further include a controller that controls operations of the first unmanned aerial vehicle and the at least one second unmanned aerial vehicle by wirelessly transmitting and receiving a signal to and from the first unmanned aerial vehicle and the at least one second unmanned aerial vehicle, wherein the at least one second unmanned aerial vehicle entering the target location transmits and receives a signal to and from the controller through the first unmanned aerial vehicle that waits at the standby location.

In addition, the unmanned aerial vehicle system may further include a manipulator that manipulates the first unmanned aerial vehicle and the at least one second unmanned aerial vehicle in real-time by wirelessly transmitting and receiving a signal to and from the first unmanned aerial vehicle and the at least one second unmanned aerial vehicle, wherein the at least one second unmanned aerial vehicle may transmit an image obtained by photographing a surrounding space to the controller.

Preferably, the at least one second unmanned aerial vehicle may enter the target location to perform indoor location recognition, perform search, monitor an environment such as gas, a temperature, and the like, and transmit a monitored result to the controller.

Preferably, the bridge may electrically connect the first unmanned aerial vehicle and the at least one second unmanned aerial vehicle, and a power supply from the first unmanned aerial vehicle to the at least one second unmanned aerial vehicle may be possible through the bridge.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 7 is a flowchart illustrating an exemplary operating method of the unmanned aerial vehicle system of FIG. 2.

DETAILED DESCRIPTION OF EXEMPLARY EMBODIMENTS

Figure 1:
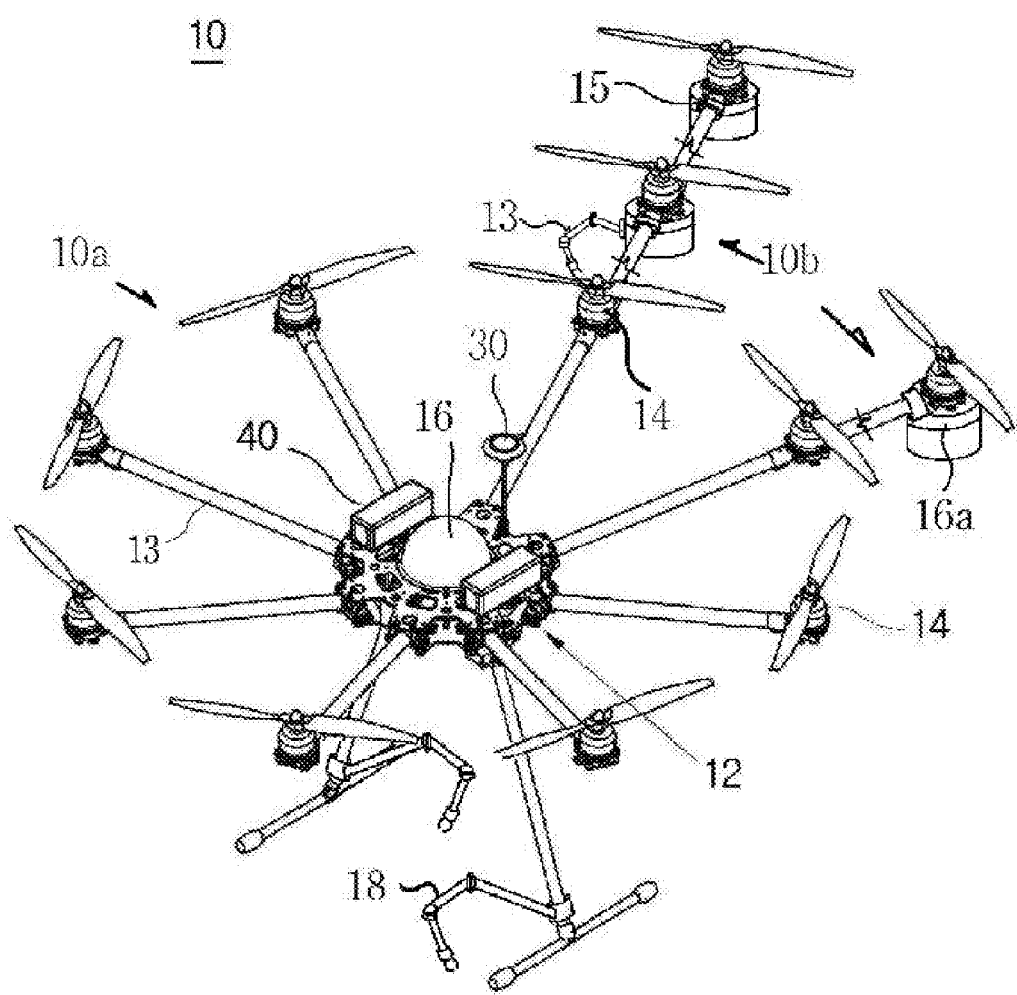
FIG. 1 is a schematic diagram illustrating a plurality of drones according to the prior art.

Advantages and characteristics of the present invention, and methods for achieving them will be apparent with reference to embodiments described below in detail in addition to the accompanying drawings. However, the present invention is not limited to the exemplary embodiments to be described below but may be implemented in various forms. Therefore, the exemplary embodiments are provided to enable those skilled in the art to thoroughly understand the teaching of the present invention and to completely inform the scope of the present invention and the exemplary embodiment is just defined by the scope of the appended claims.

The shapes, sizes, ratios, angles, numbers, and the like illustrated in the accompanying drawings for describing the exemplary embodiments of the present disclosure are merely examples, and the present disclosure is not limited thereto. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

As used herein, a phrase "an element A on an element B" refers to that the element A may be disposed directly on the element B and/or the element A may be disposed indirectly on the element B via another element C. Like reference numerals denote like elements throughout the descriptions.

Although the terms first, second, etc. may be used herein to describe various elements, it should be understood that these elements should not be limited by these terms. These terms are used only to distinguish one element from another element. Thus, a first element discussed below could be termed a second element without departing from the teachings of the present invention.

Since sizes and thicknesses of components in the drawings are arbitrarily illustrated for convenience of explanation, the following embodiments are not limited thereto.

Features of various exemplary embodiments of the present disclosure may be combined partially or totally. As will be clearly appreciated by those skilled in the art, technically various interactions and operations are possible. Various exemplary embodiments can be practiced individually or in combination.

Hereinafter, exemplary embodiments of the present disclosure will be described in detail with reference to the accompanying drawings.

Generally, drones refer to unmanned aerial vehicles, which are made in a form similar to a rotary wing aircraft, and in terms of terminology, unmanned aerial vehicle (UAV) is used in ICAO (International Civil Aviation Organization) and unmanned aircraft (UA) is used in FAA (United States Federal Aviation Administration). In the present specification, the term "unmanned aerial vehicle having a multi-rotor type rotary wing" is used instead of the term "drone" which is commercially used, and various embodiments of the drone will be described as an example of the unmanned aerial vehicle having a multi-rotor type rotary wing.

Figure 2:
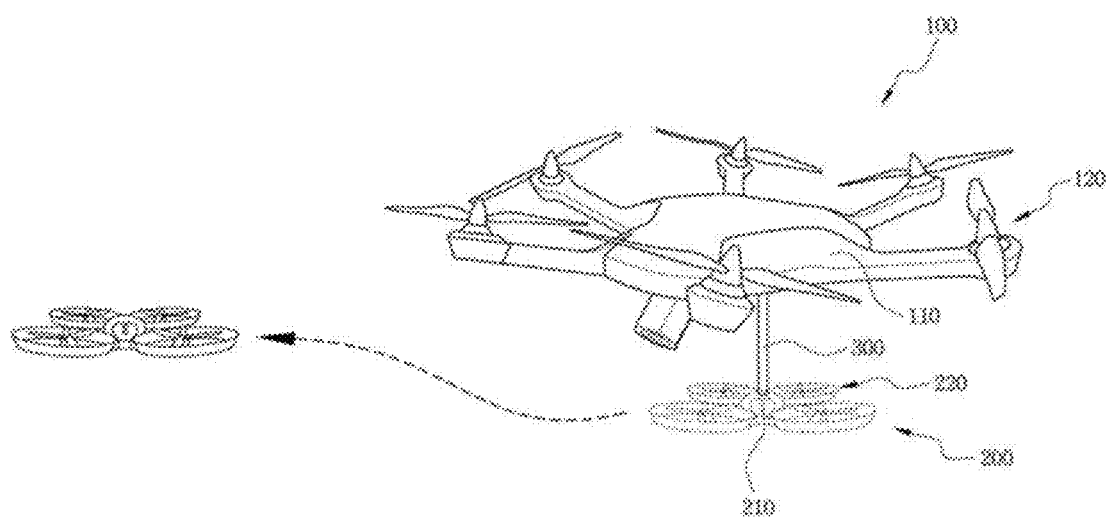
FIG. 2 is a schematic perspective diagram illustrating an unmanned aerial vehicle system having a multi-rotor type rotary wing according to an embodiment of the present invention.
Figure 3:
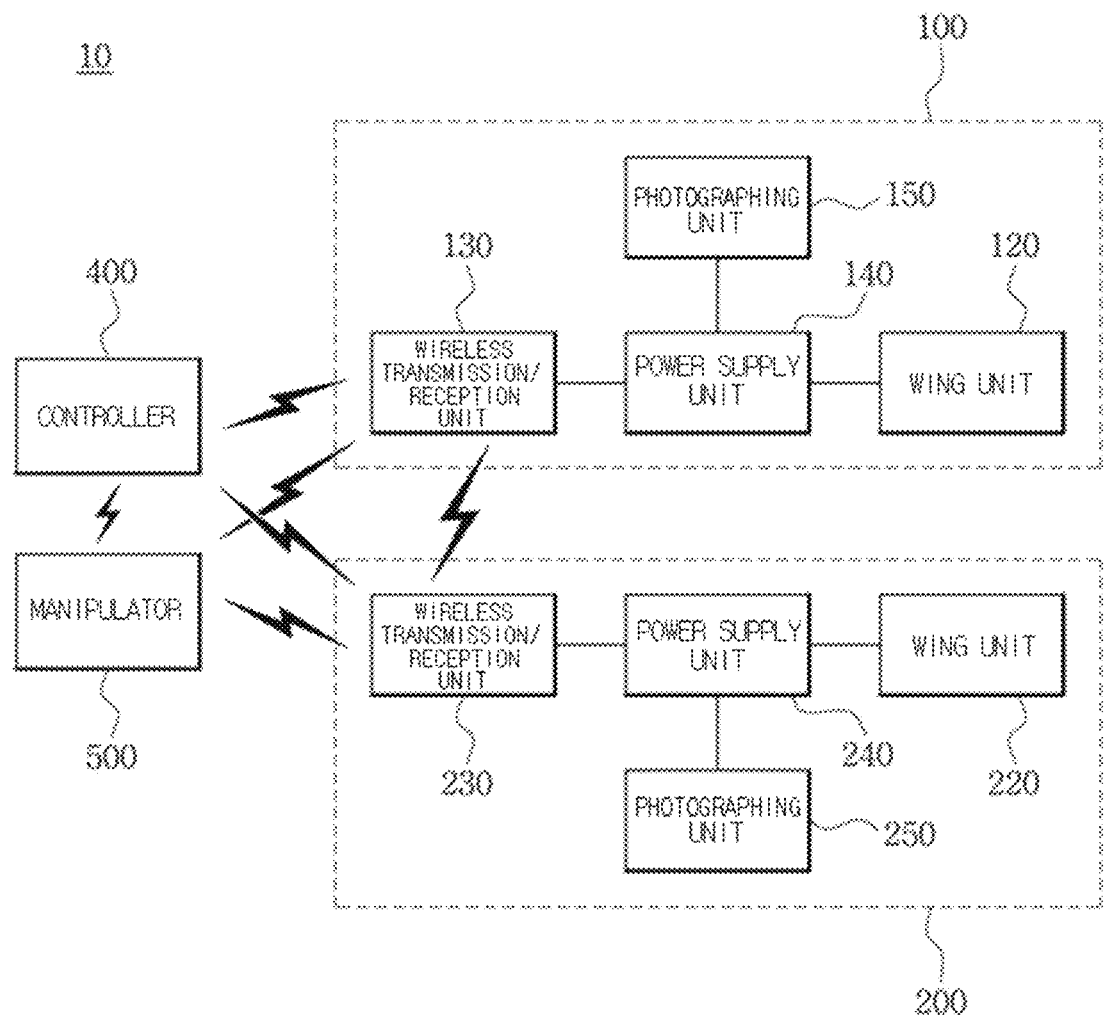
FIG. 3 is a block diagram illustrating the configuration of the unmanned aerial vehicle system of FIG. 2.

FIG. 2 is a schematic perspective diagram illustrating an unmanned aerial vehicle system having a multi-rotor type rotary wing according to an embodiment of the present invention, and FIG. 3 is a block diagram illustrating the configuration of the unmanned aerial vehicle system of FIG. 2.

Referring to FIGS. 2 and 3, an unmanned aerial vehicle system having a multi-rotor type rotary wing according to an embodiment of the present invention includes a first unmanned aerial vehicle 100, a second unmanned aerial vehicle 200, a bridge 300, a controller 400, and a manipulator 500.

The first unmanned aerial vehicle 100 and the second unmanned aerial vehicle 200 respectively include bodies 110 and 210 and wing units 120 and 220 which are provided in the bodies 110 and 210 to provide a rotational force for flight.

The shapes of the bodies 110 and 210 and the wing units 120 and 220 constituting the unmanned aerial vehicles 100 and 200 can be appropriately selected from various shapes depending on the application.

Meanwhile, the unmanned aerial vehicle system having a multi-rotor type rotary wing illustrated in FIG. 2 is a type in which the first unmanned aerial vehicle 100 transports the second unmanned aerial vehicle 200. Thus, the body 110 and wing unit 120 of the first unmanned aerial vehicle 100 are preferably formed larger than the body 210 and wing unit 220 of the second unmanned aerial vehicle 200 as described later. The sizes of the bodies 110 and 210 and wing units 120 and 220 of the first and second unmanned aerial vehicles 100 and 200 can be appropriately determined in consideration of the resistance at the required flying height and a lift force required for transportation.

Wireless transmission/reception units 130 and 230 are respectively provided in the bodies 110 and 210 of the first and second unmanned aerial vehicles 100 and 200. The first and second unmanned aerial vehicles 100 and 200 may transmit and receive signals to and from each other through the wireless transmission/reception units 130 and 230. In addition, the unmanned aerial vehicles 100 and 200 may receive signals necessary for control or steering, for example, signals related to tracking of the position of the unmanned aerial vehicles 100 and 200, and the like from the controller 400 or the manipulator 500 through the wireless transmission/reception units 130 and 230.

Meanwhile, when the second unmanned aerial vehicle 200 is separated from the first unmanned aerial vehicle 100 to perform a task, the first unmanned aerial vehicle 100 may perform the role of relay on wireless transmission and reception between the second unmanned aerial vehicle 200 and the controller 400 or the manipulator 500. That is, signals transmitted from the controller 400 or the manipulator 500 may be transmitted to the second unmanned aerial vehicle 200 located indoors via the first unmanned aerial vehicle 100 located outdoors. In addition, signals transmitted from the second unmanned aerial vehicle 200 may be transmitted to the controller 400 or the manipulator 500 via the first unmanned aerial vehicle 100.

Power supply units 140 and 240 are respectively provided in the bodies 110 and 210 of the first and second unmanned aerial vehicles 100 and 200. The power supply units 140 and 240 supply power necessary for driving the unmanned aerial vehicles 100 and 200 to the wing units 120 and 220. In addition, the power supply units 140 and 240 may supply power to components requiring power supply within the unmanned aerial vehicles 100 and 200.

According to an embodiment illustrated in FIG. 2, in the point that the first unmanned aerial vehicle 100 transports the second unmanned aerial vehicle 200 outdoors, it is preferable that the power supply unit 140 of the first unmanned aerial vehicle 100 use a large capacity battery or fuel cell. The power supply unit 240 of the second unmanned aerial vehicle 200 preferably uses a battery with an appropriate capacity in terms of transportation efficiency in consideration of the task to be performed.

Meanwhile, either or both of the first unmanned aerial vehicle 100 and the second unmanned aerial vehicle 200 may include photographing units 150 and 250. The photographing units 150 and 250 may respectively photograph the surroundings of the unmanned aerial vehicles 100 and 200 during movement, generate images and transmit the generated images to the controller 400 through the wireless transmission/reception units 130 and 230. The photographed images may be used to monitor and analyze information about coupling, separation, and movement between the unmanned aerial vehicles 100 and 200.

The above-described first and second unmanned aerial vehicles 100 and 200 may be vertically connected to and separated from each other by the bridge 300. That is, the first and second unmanned aerial vehicles 100 and 200 may be connected to each other to be moved together, or separated from each other to be moved individually. For example, the first unmanned aerial vehicle 100 may be connected to the second unmanned aerial vehicle 200 to transport the second unmanned aerial vehicle 200 during a predetermined route, and separate the second unmanned aerial vehicle 200 therefrom after the transportation.

The reason why the first and second unmanned aerial vehicles 100 and 200 are vertically connected to each other is to easily perform balancing based on the center of gravity due to the characteristics of the unmanned aerial vehicle having a multi-rotor type rotary wing. That is, the first and second unmanned aerial vehicles approach a target area in a state in which the battery of any one of the first and second unmanned aerial vehicles is saved, instead of that a plurality of unmanned aerial vehicles are coupled to increase the lift force as in the prior art, and therefore it is difficult to take the center of gravity due to the unmanned aerial vehicle which is not operated when the first and second unmanned aerial vehicles are horizontally connected to each other. In addition, since the small unmanned aerial vehicle is not operated at the operating time in the most coupling state, a down force problem is relatively small.

In this manner, the first unmanned aerial vehicle 100 and the second unmanned aerial vehicle 200 are vertically coupled to each other by the bridge 300 to be integrally operated. Therefore, it is preferable that the bridge 300 be formed of a structure and material strong enough to support the load of the second unmanned aerial vehicle 200 with respect to the first unmanned aerial vehicle 100. The bridge 300 may be completely fixed to or detachably coupled to the body 110 of the first unmanned aerial vehicle 100. The first unmanned aerial vehicle 100 and the bridge 300 may be operated in a state where they are coupled to each other, and separated only during storage. The first unmanned aerial vehicle 100 may be connected to the bridge 300 by insertion, screwing, or the like, or may be formed integrally with the bridge 300 at the time of manufacture.

The second unmanned aerial vehicle 200 is coupled to an end of the bridge 300 located opposite to the first unmanned aerial vehicle 100. As a result, the second unmanned aerial vehicle 200 may be connected to the first unmanned aerial vehicle 100 so that the second unmanned aerial vehicle 200 may be integrally formed with the first unmanned aerial vehicle 100. Meanwhile, the second unmanned aerial vehicle 200 may be connected to or separated from the first unmanned aerial vehicle 100 not only when the first unmanned aerial vehicle 100 is stationary, but also when the first unmanned aerial vehicle 100 is in flight. For example, as described later, the first unmanned aerial vehicle 100 may transport the second unmanned aerial vehicle 200 up to a standby location of a high altitude, and then may be separated from the second unmanned aerial vehicle 200 in the air so that the second unmanned aerial vehicle 200 may independently perform an individual task.

From the fact that the second unmanned aerial vehicle 200 may be separated from or coupled to the first unmanned aerial vehicle 100 in flight, it is preferable that the second unmanned aerial vehicle 200 be couple to the bride 300 in such a manner as to be electronically controlled. First, when the wireless transmission/reception unit 230 of the second unmanned aerial vehicle 200 receives a separation signal transmitted from the controller 400 or the manipulator 500, a locking means (not illustrated) within the second unmanned aerial vehicle 200 may be electronically released so that the second unmanned aerial vehicle 200 may be separated from the bridge 300. As a coupling method between the second unmanned aerial vehicle 200 and the bridge 300, a known coupling method which is electronically controllable may be appropriately employed.

The second unmanned aerial vehicle 200 may approach the first unmanned aerial vehicle 100 again to be coupled to the bridge 300 again after performing a corresponding task, so that the second unmanned aerial vehicle 200 may be connected to the first unmanned aerial vehicle 100 in flight. At this point, the second unmanned aerial vehicle 200 may be coupled to the bridge 300 through a coupling process preset in the controller 400 according to the positional relationship with the first unmanned aerial vehicle 100. In addition, the second unmanned aerial vehicle 200 may be guided to be connectable by a separate guide means (not illustrated) when approaching the first unmanned aerial vehicle 100, so that the second unmanned aerial vehicle 200 may be coupled to the bridge 300.

The bridge 300 may allow the first unmanned aerial vehicle 100 and the second unmanned aerial vehicle 200 to be electrically connected to each other. For example, the power supply unit 240 of the second unmanned aerial vehicle 200 may receive a power supply from the power supply unit 140 of the first unmanned aerial vehicle 100 through the bridge 300. As a result, when lacking power during performing a corresponding task, the second unmanned aerial vehicle 200 may be coupled to the first unmanned aerial vehicle 100 again to receive a power supply, and continue to perform the corresponding task.

Hereinafter, a lift force control of an unmanned aerial vehicle system having a multi-rotor type rotary wing according to an embodiment of the present invention will be described with reference to FIG. 4.

Figure 4:
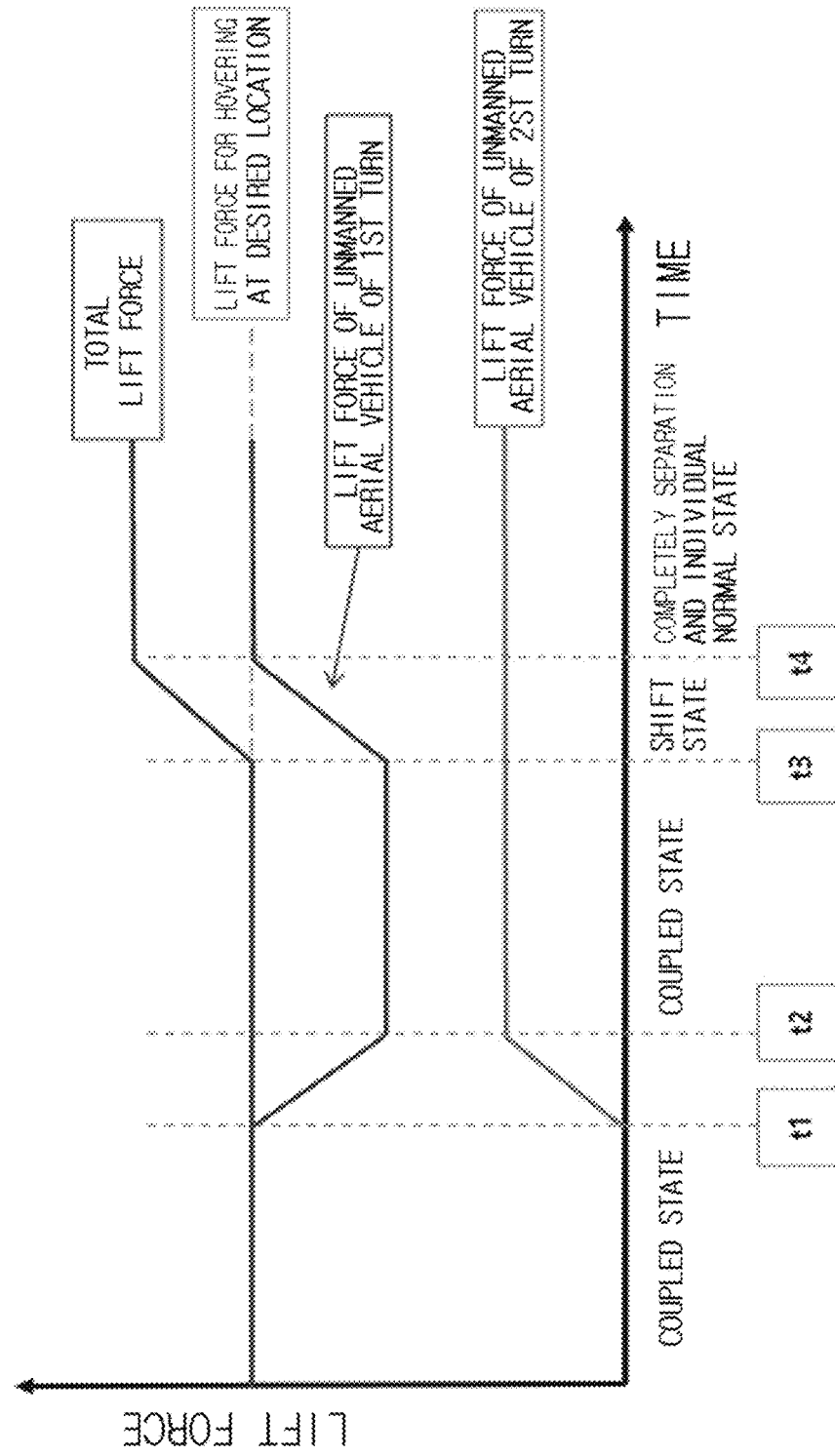
FIG. 4 is a graph illustrating a lift force control of an unmanned aerial vehicle system having a multi-rotor type rotary wing according to an embodiment of the present invention.

FIG. 4 is a graph illustrating a lift force control of an unmanned aerial vehicle system having a multi-rotor type rotary wing according to an embodiment of the present invention. The horizontal axis of the graph represents time, and the vertical axis of the graph represents a lift force.

As illustrated in FIG. 2, when one or more unmanned aerial vehicles are simultaneously operated, the balance of a lift force is broken so that hovering may be difficult. Accordingly, before t1 in which the first unmanned aerial vehicle and the second unmanned aerial vehicle are merely coupled to each other, only the first unmanned aerial vehicle may generate a lift force and the second unmanned aerial vehicle does not generate a lift force. Thereafter, when the second unmanned aerial vehicle generates a lift force in order to be separated from the first unmanned aerial vehicle, the first unmanned aerial vehicle may reduce a lift force by the lift force generated by the second unmanned aerial vehicle. That is, even though the second unmanned aerial vehicle generates the lift force in a period from t1 to t3, the total lift force is the same. The first unmanned aerial vehicle and the second unmanned aerial vehicle maintain their coupling state until the second unmanned aerial vehicle reaches a normal state (a level at which hovering is possible even when the second unmanned aerial vehicle is separated).

When the second unmanned aerial vehicle is separated from the first unmanned aerial vehicle at t3, the lift force of the second unmanned aerial vehicle remains as is, but the first unmanned aerial vehicle returns to a lift force in which hovering is possible by the first unmanned aerial vehicle alone. That is, when the second unmanned aerial vehicle is separated from the first unmanned aerial vehicle, the first unmanned aerial vehicle firstly becomes deprived of the lift force and the altitude of the first unmanned aerial vehicle is decreased. Therefore, the first unmanned aerial vehicle recovers the lift force by increasing its own power and enters a hovering mode again. Thereafter, the first unmanned aerial vehicle and the second unmanned aerial vehicle may be operated independently of each other.

Hereinafter, various coupling methods of unmanned aerial vehicles will be described with reference to FIGS. 5A to 6C. For convenience of description, the first unmanned aerial vehicle 100 and the second unmanned aerial vehicle 200 which have been described in FIG. 2 are simplified, illustrated, and described as a mother drone and a baby drone, respectively.

Figure 5A:
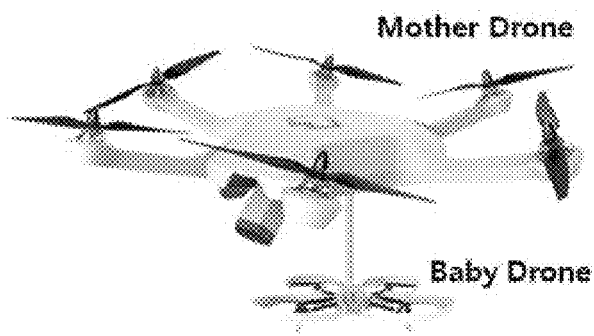
FIGS. 5A to 5C are schematic diagrams illustrating a state in which baby drones are coupled vertically below a mother drone according to an embodiment of the present invention.
Figure 5B:
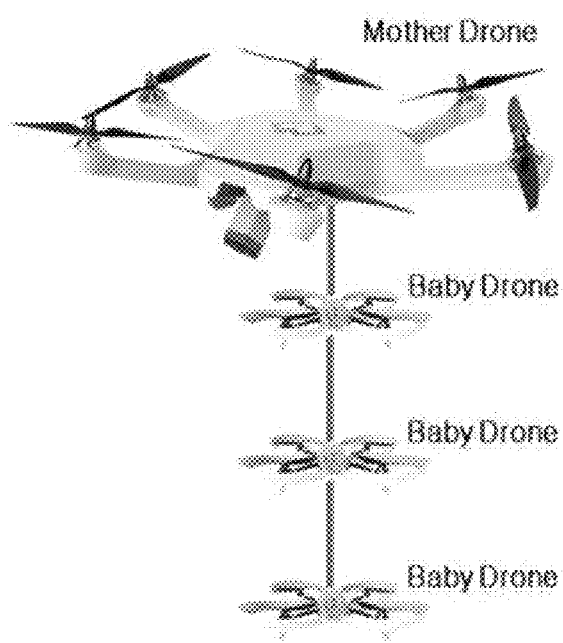
Figure 5C:
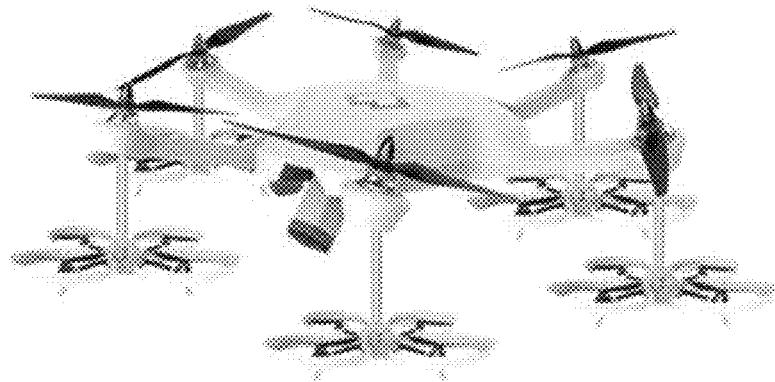

FIGS. 5A to 5C are schematic diagrams illustrating a state in which baby drones are coupled vertically below a mother drone according to an embodiment of the present invention. The mother drone and the baby drone may be coupled to each other by a bridge. Here, a single baby drone may be connected to the mother drone as illustrated in FIG. 5A, or a plurality of baby drones may be continuously connected below the mother drone as illustrated in FIG. 5B. Alternatively, a plurality of baby drones may be connected to the mother drone by a plurality of bridges as illustrated in FIG. 5C. The plurality of drones are movable in a state where a part or all of the bridges are connected.

FIG. 5C is illustratively shown for convenience of illustration, and the baby drones may be coupled to be arranged in any direction of the mother drone. For example, the plurality of baby drones may be connected to the side of the mother drone so as to be symmetrical about the center of the mother drone. However, as illustrated in FIG. 5C, in a case in which one or more baby drones are mounted, a change in the overall center of gravity is inevitable when the corresponding baby drone is separated. At this point, since the movement of the center of gravity can be predicted, balancing control should be performed considering the predicted movement. In general, the drones perform balancing control based on a tilt sensor, but when the baby drones are separated, it is possible to estimate changes in the weight and lift force in a state in which the corresponding drone is separated, so that rapid balancing control is possible even without the tilt sensor.

Figure 6A:
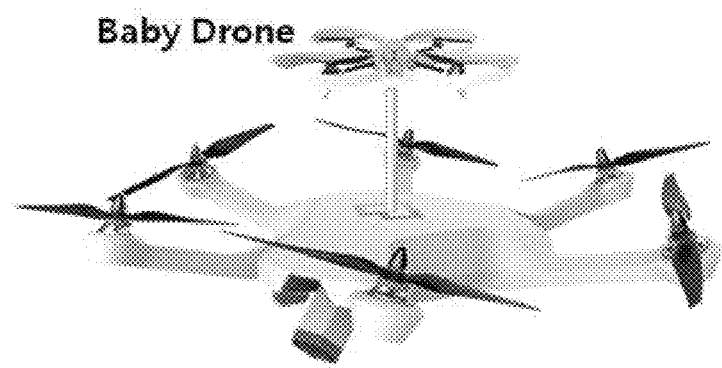
FIGS. 6A to 6C are schematic diagrams illustrating a state in which baby drones are coupled vertically above a mother drone according to an embodiment of the present invention.
Figure 6B:
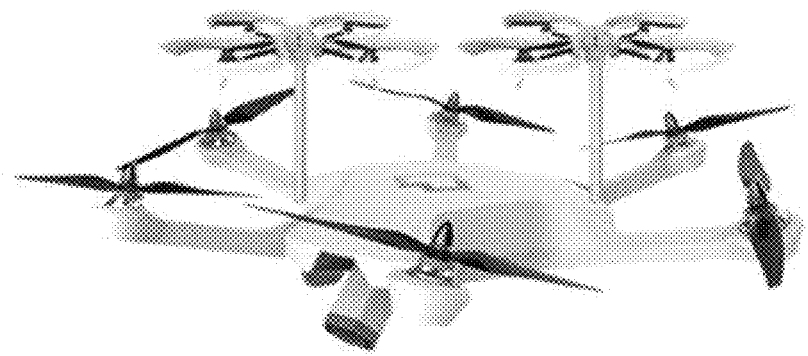
Figure 6C:
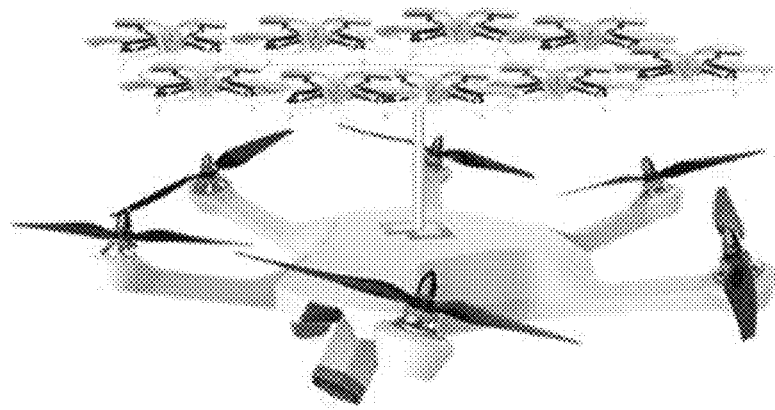

FIGS. 6A to 6C are schematic diagrams illustrating a state in which baby drones are coupled vertically above a mother drone according to an embodiment of the present invention. As illustrated in FIG. 6A, a single baby drone may be connected above a mother drone through a single bridge. Alternatively, as illustrated in FIG. 6B, two or more baby drones may be respectively connected above a mother drone by two or more bridges. Alternatively, as illustrated in FIG. 6C, a single bridge is provided, but a plurality of baby drones may be connected above a mother drone by another upper connection means.

Hereinafter, operations of an unmanned aerial vehicle system having a multi-rotor type rotary wing according to an embodiment of the present invention will be described with reference to FIG. 7. FIG. 7 is a flowchart illustrating an example of operations of an unmanned aerial vehicle system having a multi-rotor type rotary wing according to an embodiment of the present invention.

First, in operation S10, the first unmanned aerial vehicle 100 and the second unmanned aerial vehicle 200 are moved from a starting location to a standby location outdoors which is adjacent to a target location while they are connected to each other. At this point, the first unmanned aerial vehicle 100 is moved while supporting the second unmanned aerial vehicle 200 through the bridge 300.

For example, the first unmanned aerial vehicle 100 may be moved from the ground to the outdoor location of a corresponding floor elevation of a building having the target location. At this point, the second unmanned aerial vehicle 200 is transported without being driven.

Meanwhile, when the target location is designated, the controller 400 may determine a movement route according to a preset rule and move the first unmanned aerial vehicle 100 and the second unmanned aerial vehicle 200. In addition, the first unmanned aerial vehicle 100 may be directly manipulated using the manipulator 500 to be moved to the target location.

Next, in operation S20, after reaching the standby location, the second unmanned aerial vehicle 200 is separated from the first unmanned aerial vehicle 100. When it is confirmed by the controller 400 that the first unmanned aerial vehicle 100 and the second unmanned aerial vehicle 200 reach the standby location, the controller 400 transmits a separation signal to the first unmanned aerial vehicle 100 or the second unmanned aerial vehicle 200. At this point, the first unmanned aerial vehicle 100 or the second unmanned aerial vehicle 200 may be separated from each other by a preset separation process or manual operation.

The first unmanned aerial vehicle 100 from which the second unmanned aerial vehicle 200 is separated may be controlled to hover at the standby location. That is, when the first unmanned aerial vehicle 100 is out of the standby location due to an external force, the first unmanned aerial vehicle 100 may be controlled to be moved in a direction of reducing an error between a current location and the standby location based on the standby location.

After the separation, the second unmanned aerial vehicle 200 can fly separately from the first unmanned aerial vehicle 100. At this point, the second unmanned aerial vehicle 200 may be operable by the controller 400 or the manipulator 500.

Next, in operation S30, the second unmanned aerial vehicle 200 performs a given task while being moved to the indoor target location. For example, in the case of the second unmanned aerial vehicle 200 that enters the fire scene, the presence/absence and location of the survivor may be determined through the photographing unit 250.

From the point that the second unmanned aerial vehicle 200 is operated indoors, it is advantageous for the second unmanned aerial vehicle 200 to communicate with the controller 400 or the manipulator 500 through the first unmanned aerial vehicle 100 located in the close outdoor position while a corresponding task is performed. The location of the second unmanned aerial vehicle 200, the photographed image, and the like may be transmitted to the controller 400 through the wireless transmission/reception unit 130 of the first unmanned aerial vehicle 100 from the wireless transmission/reception unit 230.

Meanwhile, based on the photographed image, the second unmanned aerial vehicle 200 may be manipulated in real-time using the manipulator 500 so that the second unmanned aerial vehicle 200 may be moved to a desired location to perform a task.

Next, in operation S40, after performing the task, the second unmanned aerial vehicle 200 is moved to the first unmanned aerial vehicle 100 which is hovering at the standby location and coupled to the first unmanned aerial vehicle 100 again.

At this point, the first unmanned aerial vehicle 100 may be in flight at the standby location before the separation, but it may be flying at another standby location adjacent to a location where the task of the second unmanned aerial vehicle 200 is completed.

The second unmanned aerial vehicle 200 may be moved in such a manner that a coupled portion above the body 210 of the second unmanned aerial vehicle 200 and an end of the bridge 300 come close to each other. Here, the second unmanned aerial vehicle 200 may be coupled to the bridge 300 by a preset coupling process through the controller 400, or coupled to the bridge 300 by the aid of a guide means.

In operation S50, after re-coupling, the first unmanned aerial vehicle 100 and the second unmanned aerial vehicle 200 are moved to the starting location to complete the task. Meanwhile, when other tasks are given consecutively, the first unmanned aerial vehicle 100 and the second unmanned aerial vehicle 200 may be moved to a standby location adjacent to the next target location, and perform the tasks by repeatedly performing the above-described operations.

Hereinafter, an example in which an unmanned aerial vehicle is operated when a fire occurs will be described with reference to FIGS. 8 and 9.

Figure 8:
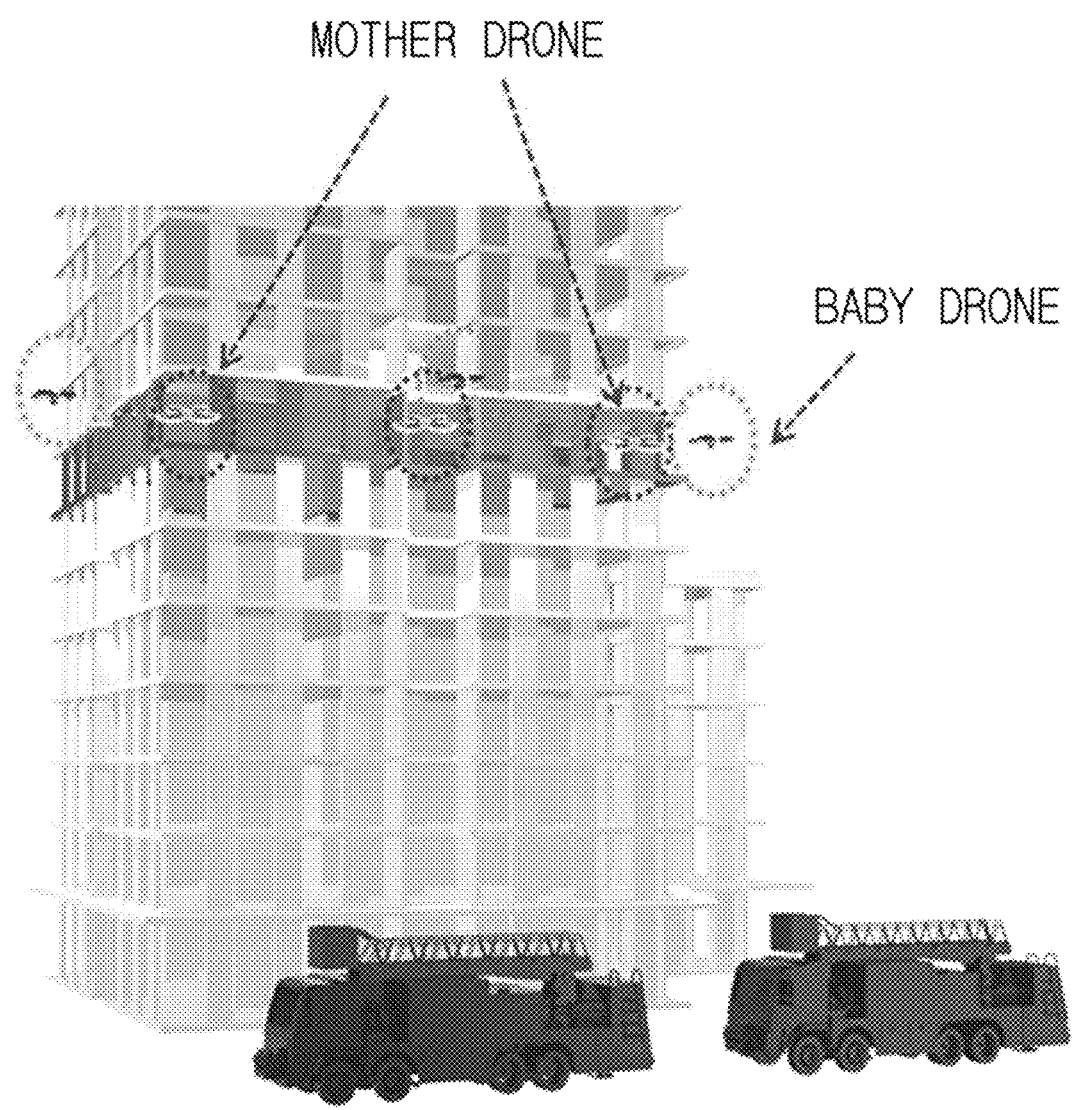
FIGS. 8 and 9 are diagrams illustrating an example in which an unmanned aerial vehicle system having a multi-rotor type rotary wing according to an embodiment of the present invention is operated when a fire occurs in a high-rise building.
Figure 9:
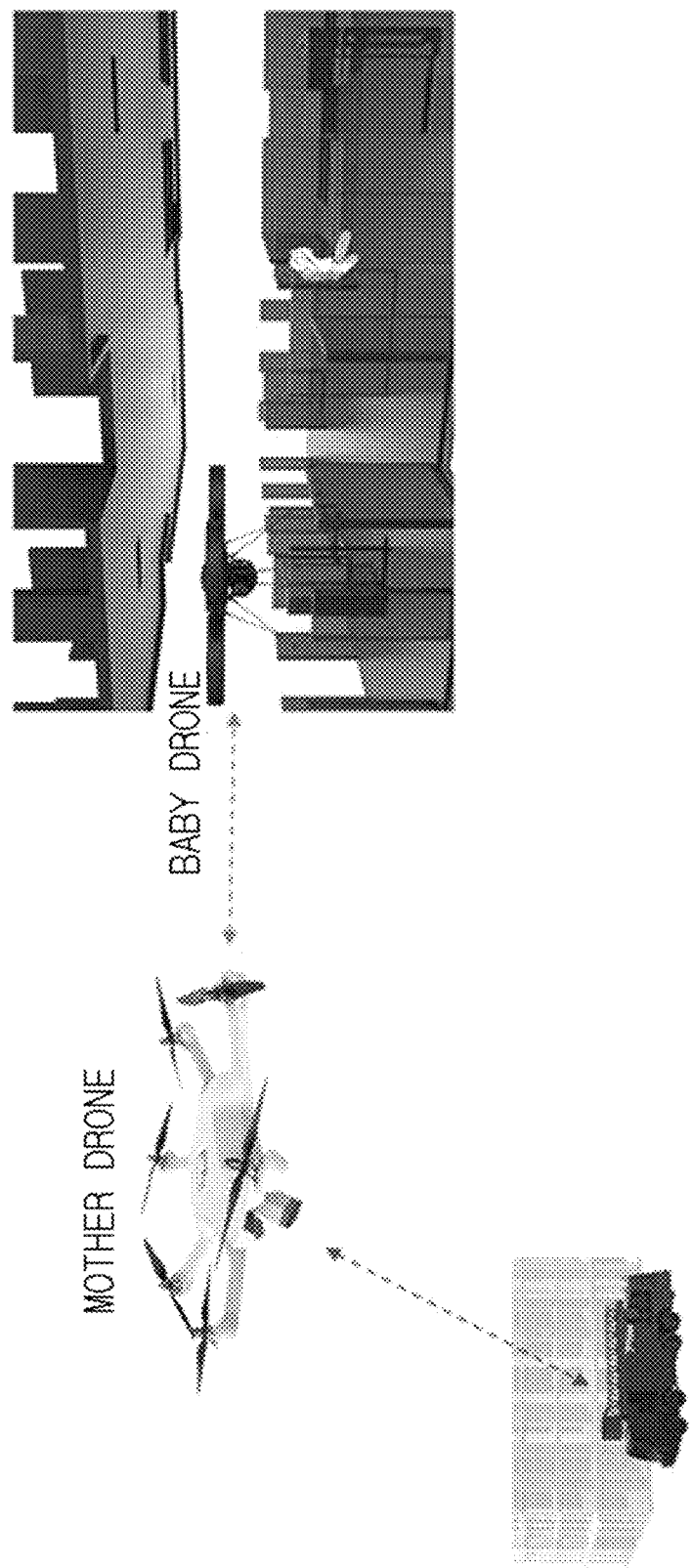

FIGS. 8 and 9 are diagrams illustrating an example in which an unmanned aerial vehicle system having a multi-rotor type rotary wing according to an embodiment of the present invention is operated when a fire occurs in a high-rise building. In an unmanned aerial vehicle system having a multi-rotor type rotary wing according to an embodiment of the present invention, for convenience of description, the first unmanned aerial vehicle 100 and the second unmanned aerial vehicle 200 are simplified, illustrated, and described as a mother drone and a baby drone, respectively.

Referring to FIG. 8, it is difficult for fire trucks to approach the fire site when a fire occurs in a high-rise building. In this case, for early fire response and monitoring, the mother drone may approach a high floor while being coupled to the baby drone. The baby drones may be coupled vertically above or below the mother drone in various forms, as described above. At this point, the baby drones are in a stationary state in which no lift force is generated. When the mother drone is coupled to the baby drones to reach a target altitude or location, they can reach the site entrance of the disaster floor as close as possible.

Next, the baby drones are separated from the mother drone while the mother drone is stable hovering at the target location. The baby drones are controlled to enter the building's disaster scene, and the mother drone is controlled to fixedly standby at a separated location.

For this operation, the mother drone can be equipped with a fuel cell or a large capacity battery. Accordingly, the mother drone may have a large transportable weight and hover for a long period of time, and therefore the mother drone may come very close to the disaster area of a high-rise building, and may be operated in a standby mode. On the other hand, the baby drones can be equipped with an adequate capacity battery smaller than that of the mother drone. Accordingly, since the operating time is short, the baby drones are not operated when being moved to a desired location, and enter a building and are operated for the purpose of indoor operation or entering a target area.

FIG. 9 illustrates a state in which a baby drone enters a building in a standby state of a mother drone. The baby drone may enter a target location to perform indoor location recognition, perform search, and monitor an environment such as gas, a temperature, and the like. In addition, the baby drone may transmit a disaster environment and rescue information using images. The mother drone may act as a communication repeater for the baby drone in the standby state, and monitor the baby drone or provide an additional navigation signal. In addition, the mother drone may establish a temporary communication network such as 4G/3G or the like for the target area.

Although the embodiments of the present invention have been described above with reference to the accompanying drawings, obviously many modifications and changes may be made by those skilled in this art without departing from the scope of the invention. Therefore, the embodiments disclosed in the present invention are not intended to limit the technical spirit of the present invention, but are intended to describe the invention. The technical spirit of the present invention is not limited to such embodiments. The scope of the present invention must be defined by the following claims, and all equivalents thereof should be interpreted as being included in the technical spirit and scope of the present invention.

What is claimed is:

1. An unmanned aerial vehicle system having a multi-rotor type rotary wing, comprising:
   a first unmanned aerial vehicle;
   a plurality of second unmanned aerial vehicles;
   a bridge configured to connect the first unmanned aerial vehicle and the plurality of second unmanned aerial vehicles so that the plurality of second unmanned aerial vehicles are separable from the first unmanned aerial vehicle; and
   a controller configured to, in response to one of the plurality of second unmanned aerial vehicles generating a first lift force for separating from the first unmanned aerial vehicle, reduce a second lift force being generated by the first unmanned aerial vehicle by an amount equal to the first lift force,
   wherein the plurality of second unmanned aerial vehicles are moveable by the first unmanned aerial vehicle in a state in which the plurality of second unmanned aerial vehicles are coupled to the first unmanned aerial vehicle by the bridge without being driven, and
   wherein the plurality of second unmanned aerial vehicles are configured to be coupled vertically above the first unmanned aerial vehicle by the bridge.

2. The unmanned aerial vehicle system of claim 1, wherein the plurality of second unmanned aerial vehicles have a smaller size than a size of the first unmanned aerial vehicle.

3. The unmanned aerial vehicle system of claim 1, wherein the controller is further configured to control the first unmanned aerial vehicle and the plurality of second unmanned aerial vehicles so that
   in a state in which the first unmanned aerial vehicle and the plurality of second unmanned aerial vehicles are coupled to each other, the first unmanned aerial vehicle generates lift and the plurality of second unmanned aerial vehicles do not generate lift, and
   in a state in which the one of the plurality of second unmanned aerial vehicles is separated from the first unmanned aerial vehicle, the first lift force remains constant, and the second lift force is set for the first unmanned aerial vehicle to hover.

4. The unmanned aerial vehicle system of claim 1, wherein the controller is further configured to control the first unmanned aerial vehicle and the plurality of second unmanned aerial vehicles so that
the first unmanned aerial vehicle transports the plurality of second unmanned aerial vehicles up to a standby location, and
the plurality of second unmanned aerial vehicles separate from the first unmanned aerial vehicle at the standby location and enter a target location.

5. The unmanned aerial vehicle system of claim 4, wherein the controller is further configured to set the standby location at an outdoor location, and set the target location at an indoor location.

6. The unmanned aerial vehicle system of claim 4, wherein the controller is further configured to
control operations of the first unmanned aerial vehicle and the plurality of second unmanned aerial vehicles by wirelessly transmitting and receiving signals to and from the first unmanned aerial vehicle and the plurality of second unmanned aerial vehicles, and
control the plurality of second unmanned aerial vehicles that are entering the target location to transmit and receive signals to and from the controller through the first unmanned aerial vehicle that waits at the standby location.

7. The unmanned aerial vehicle system of claim 6, further comprising:
a manipulator configured to manipulate the first unmanned aerial vehicle and the plurality of second unmanned aerial vehicles in real-time by wirelessly transmitting and receiving signals to and from the first unmanned aerial vehicle and the plurality of second unmanned aerial vehicles,
wherein the plurality of second unmanned aerial vehicles are configured to transmit an image obtained by photographing a surrounding space to the controller.

8. The unmanned aerial vehicle system of claim 6, wherein the controller is further configured to control the plurality of second unmanned aerial vehicles to enter the target location to perform indoor location recognition, perform search operations, monitor an environment, monitor a temperature, and transmit a monitored result to the controller.

9. The unmanned aerial vehicle system of claim 1, wherein
the bridge is further configured to electrically connect the first unmanned aerial vehicle and the plurality of second unmanned aerial vehicles, and
power is supplied from the first unmanned aerial vehicle to the plurality of second unmanned aerial vehicles through the bridge.

10. The unmanned aerial vehicle system of claim 1, wherein the controller is further configured to, in response to determining that the first unmanned aerial vehicle and the plurality of second unmanned aerial vehicles reach a standby location, transmit a separation signal to the first unmanned aerial vehicle or the plurality of second unmanned aerial vehicles.

11. The unmanned aerial vehicle system of claim 1, wherein the controller is further configured to, in response to the one of the plurality of second unmanned aerial vehicles detaching from the first unmanned aerial vehicle and thereby causing a change in a center of gravity of the first unmanned aerial vehicle and remaining attached vehicles among the second unmanned aerial vehicles, perform balancing control for the first unmanned aerial vehicle by predicting the change in the center of gravity.

12. An unmanned aerial vehicle system having a multi-rotor type rotary wing, comprising:
a first unmanned aerial vehicle;
a plurality of second unmanned aerial vehicles;
a bridge configured to connect the first unmanned aerial vehicle and the plurality of second unmanned aerial vehicles so that the plurality of second unmanned aerial vehicles are separable from the first unmanned aerial vehicle; and
a controller configured to, in response to one of the plurality of second unmanned aerial vehicles generating a first lift force for separating from the first unmanned aerial vehicle, reduce a second lift force being generated by the first unmanned aerial vehicle,
wherein the plurality of second unmanned aerial vehicles are moveable by the first unmanned aerial vehicle in a state in which the plurality of second unmanned aerial vehicles are coupled to the first unmanned aerial vehicle by the bridge without being driven,
wherein the plurality of second unmanned aerial vehicles are configured to be coupled vertically above the first unmanned aerial vehicle by the bridge, and
wherein the controller is further configured to, in response to the one of the plurality of second unmanned aerial vehicles detaching from the first unmanned aerial vehicle and thereby causing a change in a center of gravity of the first unmanned aerial vehicle and remaining attached vehicles among the second unmanned aerial vehicles, perform balancing control for the first unmanned aerial vehicle by predicting the change in the center of gravity.

* * * * *